United States Patent [19]
Wafer et al.

[11] Patent Number: 5,969,921
[45] Date of Patent: Oct. 19, 1999

[54] GROUND FAULT ELECTRICAL SWITCHING APPARATUS FOR COORDINATING TRIPPING WITH A DOWNSTREAM GROUND FAULT SWITCH

[75] Inventors: John A. Wafer, Beaver; Raymond W. MacKenzie, Baldwin, both of Pa.

[73] Assignee: Eaton Corporation, Cleveland, Ohio

[21] Appl. No.: 09/015,806

[22] Filed: Jan. 29, 1998

[51] Int. Cl.⁶ .................................................. H02H 3/16
[52] U.S. Cl. .................................. 361/45; 361/46; 361/50
[58] Field of Search .................................. 361/42–46, 78, 361/79, 86–89, 91, 93, 94, 97, 103–105

[56] References Cited

U.S. PATENT DOCUMENTS

| | | | |
|---|---|---|---|
| Re. 30,304 | 6/1980 | Eckart | 361/44 |
| 3,852,642 | 12/1974 | Engel et al. | 317/18 D |
| 3,858,130 | 12/1974 | Misencik | 335/18 |
| 3,878,435 | 4/1975 | Van Zeeland et al. | 317/18 D |
| 3,898,529 | 8/1975 | Reenstra | 361/46 |
| 3,930,187 | 12/1975 | Misencik | 317/18 D |
| 4,001,648 | 1/1977 | Taketa et al. | 317/18 D |
| 4,010,431 | 3/1977 | Virani et al. | 335/18 |
| 4,081,852 | 3/1978 | Coley et al. | 361/45 |
| 4,156,884 | 5/1979 | Eckart et al. | 361/46 |
| 4,194,231 | 3/1980 | Klein | 361/45 |
| 4,208,688 | 6/1980 | Misencik et al. | 361/46 |
| 4,250,532 | 2/1981 | Davis | 361/96 |
| 4,271,444 | 6/1981 | Howell | 361/48 |
| 4,380,785 | 4/1983 | Demeyer et al. | 361/96 |
| 4,707,759 | 11/1987 | Bodkin | 361/48 |
| 4,897,756 | 1/1990 | Zylstra | 361/44 |
| 4,949,214 | 8/1990 | Spencer | 361/95 |
| 5,224,006 | 6/1993 | MacKenzie et al. | 361/45 |
| 5,307,230 | 4/1994 | MacKenzie | 361/96 |
| 5,341,191 | 8/1994 | Crookston et al. | 335/16 |
| 5,459,630 | 10/1995 | MacKenzie et al. | 361/45 |
| 5,519,561 | 5/1996 | Mrenna et al. | 361/105 |

OTHER PUBLICATIONS

Raytheon Semiconductor, LM1851 Ground Fault Interrupter, pp. 1–10.
Raytheon Semiconductor, RV4141 Low Power Ground Fault Interrupter, pp. 3–829–3–834.
Raytheon Company Semiconductor Division, RV4145 Low Power Ground Fault Interrupter, Preliminary Product Specifications Linear Integrated Circuits, RV4145 pp. 1–7.

*Primary Examiner*—Albert W. Paladini
*Assistant Examiner*—Kim Huynh
*Attorney, Agent, or Firm*—Martin J. Moran

[57] ABSTRACT

A ground fault circuit breaker includes separable contacts for interrupting current flow in a protected AC electric system when opened. The protected AC electric system includes a ground fault switch, such as a ground fault receptacle having a people protection ground fault trip curve, downstream from the ground fault circuit breaker. A current transformer generates an AC sensor signal representative of AC current flowing from the protected AC electric system to ground. A ground fault controller, connected to the current transformer, generates a ground fault trip signal as a function of the AC sensor signal and an equipment protection ground fault trip curve. A trip means, which is responsive to the ground fault trip signal, opens the separable contacts.

20 Claims, 5 Drawing Sheets

GROUND FAULT ELECTRICAL SWITCHING APPARATUS FOR COORDINATING TRIPPING WITH A DOWNSTREAM GROUND FAULT SWITCH

BACKGROUND OF THE INVENTION

1. Field of the Invention

This invention is directed to electrical switching apparatus and, more particularly, to circuit interrupters, such as a circuit breakers, which respond to ground faults, and in particular to such circuit interrupters which are employed with downstream devices.

2. Background Information

Electrical switching apparatus include, for example, circuit switching devices and circuit interrupters such as circuit breakers, contactors, motor starters, motor controllers and other load controllers. Circuit breakers are generally old and well known in the art. An example of a circuit breaker is disclosed in U.S. Pat. No. 5,341,191. Circuit breakers are used to protect electrical circuitry from damage due to an overcurrent condition, such as an overload condition or a relatively high level short circuit or fault condition.

Ground fault circuit interrupters include ground fault circuit breakers (GFCBs) and other ground fault contactors, motor starters, motor controllers and other load controllers.

Ground fault switches include ground fault receptacles (GFRs), and cord-mounted or plug-mounted ground fault protection devices (e.g., ground fault protection circuitry at the alternating current (AC) plug end of the AC power cord of an appliance, such as a hair dryer).

A typical ground fault circuit interrupter includes an operational amplifier which amplifies a sensed ground fault signal and applies the amplified signal to a window comparator. The window comparator compares the amplified signal to positive and negative reference values. If either reference value is exceeded in magnitude, a trip signal is generated.

A common type of ground fault detection circuit is the dormant oscillator detector. This detector includes a first sensor coil through which the line and neutral conductors of the protected circuit pass. The output of the first sensor coil is applied through a coupling capacitor to the above-described operational amplifier followed by the window comparator. A line-to-ground fault causes the magnitude of the amplified signal to exceed the magnitude of one of the reference values and, thus, generates a trip signal. The dormant oscillator ground fault detector also includes a second sensor coil through which at least the neutral conductor passes. A neutral-to-ground fault couples the two detector coils causing the amplifier to oscillate which also results in the generation of the trip signal.

GFCBs can provide an additional level of wiring protection, especially when used in conjunction with arc fault detection (AFD). However, there has been a tendency to favor the use of GFRs over the use of GFCBs, due to the convenience of localized resetting. GFRs cannot, of course, protect any wiring preceding them.

Accordingly, there is room for improvement in the circuit interruption function of electrical switching apparatus.

SUMMARY OF THE INVENTION

This need and others are satisfied by the invention, which is directed to a ground fault electrical switching apparatus. The ground fault electrical switching apparatus interrupts current in a protected alternating current (AC) electric system including a downstream ground fault switch having a first trip curve. The ground fault electrical switching apparatus includes trip signal generating means for generating a ground fault trip signal as a function of an AC sensor signal and a second trip curve which is different from the first trip curve.

The ground fault electrical switching apparatus comprises separable contact means for interrupting current flow in a protected AC electric system when opened. A sensing means generates at least an AC sensor signal representative of AC current flowing from the protected AC electric system to ground. A trip signal generating means connected to the sensing means generates at least a ground fault trip signal as a function of the AC sensor signal and a trip curve which is different from another trip curve of a downstream ground fault switch. A trip means which is responsive to the ground fault trip signal opens the separable contact means.

The ground fault electrical switching apparatus preferably employs a ground fault trip curve which is coordinated with the trip curve of the ground fault switch, such as a GFR. For all ground faults which occur beyond the downstream GFR, the GFR interrupts the circuit current before the ground fault electrical switching apparatus responds, thereby maintaining the ability to reset locally at the GFR. The ground fault electrical switching apparatus provides protection for ground faults due to damaged permanent wiring, and also due to damaged plug-in wiring when the GFR is not used, thereby reducing the risk that a ground fault in damaged wiring may be the precursor to a fire.

Preferably, the first trip curve of the ground fault switch employs a people protection trip curve and the second trip curve of the trip signal generating means employs an equipment protection trip curve.

As another aspect of the invention, a protected alternating current (AC) electric system comprises a ground fault switch having a first trip curve; and a ground fault electrical switching apparatus. The ground fault electrical switching apparatus comprises separable contact means for interrupting current flow in the protected AC electric system when opened, sensing means for generating at least an AC sensor signal representative of AC current flowing from the protected AC electric system to ground, trip signal generating means connected to the sensing means for generating at least a ground fault trip signal as a function of the AC sensor signal and a second trip curve which is different from the first trip curve, and trip means responsive to the ground fault trip signal for opening the separable contact means.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

The invention will be described as applied to a conventional residential circuit breaker in combination with a conventional ground fault receptacle (GFR), although it will be appreciated by those skilled in the art that the invention has application to other types of ground fault circuit interrupters and ground fault switches.

As employed herein, the term "ground fault switch" shall expressly exclude ground fault circuit breakers and shall expressly include ground fault receptacles (GFRs), and cord-mounted or plug-mounted ground fault protection devices.

In particular, the invention will be described as applied to a circuit breaker of the type described in U.S. Pat. Nos. 4,081,852 and 5,519,561 which are incorporated by reference herein. The circuit breaker of U.S. Pat. No. 4,081,852 incorporates a thermal-magnetic trip device comprising a bimetal and a magnetic armature which unlatch a spring driven trip mechanism to open separable contacts in response to a persistent overcurrent and a short circuit current, respectively. The circuit breaker of U.S. Pat. No. 4,081,852 includes the thermal-magnetic trip device and a ground fault detector mounted in side-by-side compartments within a molded housing. The ground fault detector includes a trip solenoid having a plunger which extends through the wall between the two compartments in the molded housing to actuate the thermal-magnetic trip device to trip the circuit breaker in response to a ground fault.

Figure 1A:
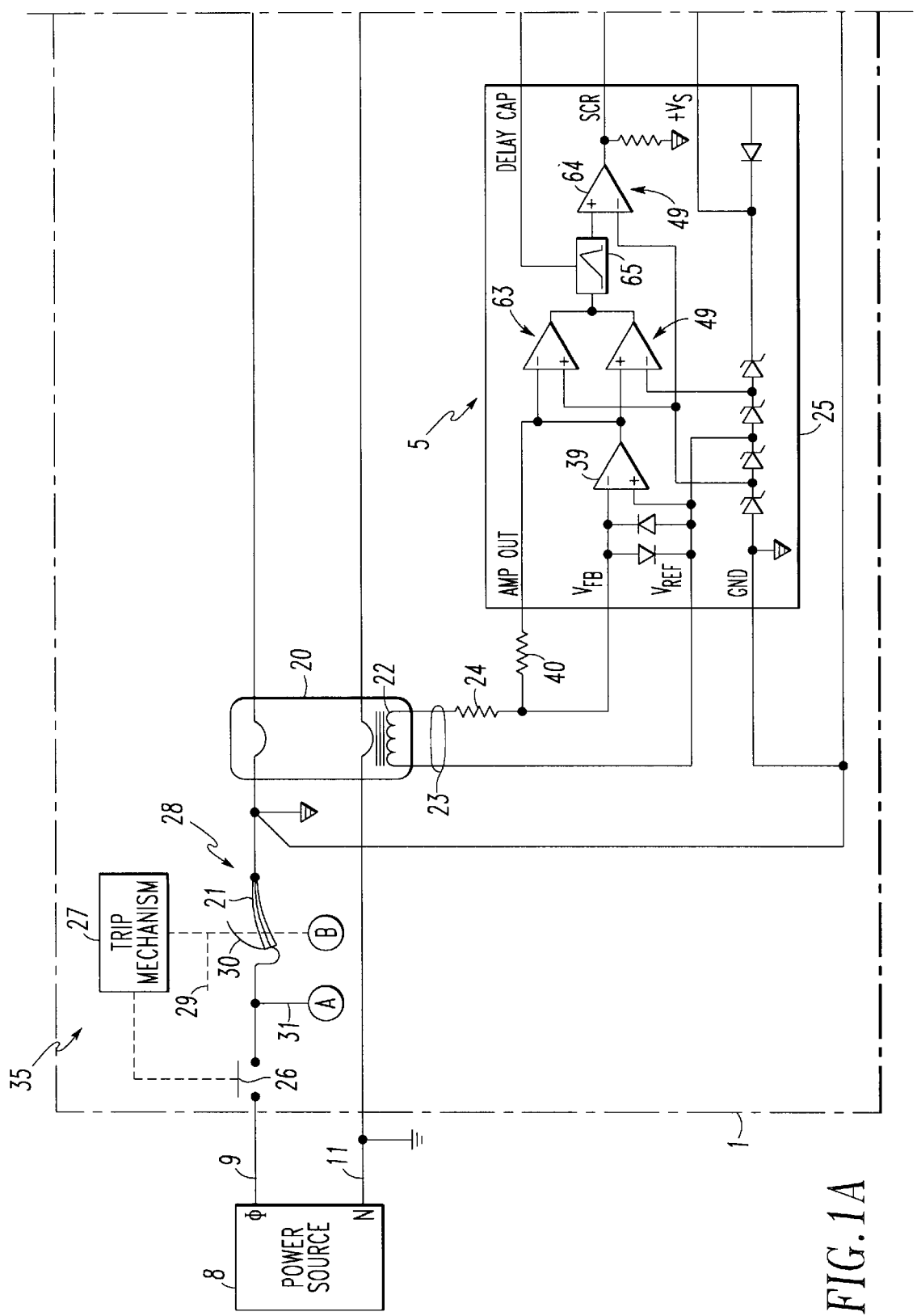
FIGS. 1A and 1B are a schematic diagram of one embodiment of the ground fault circuit interrupter of the invention combined with a sputtering arc fault detection (AFD) circuit.
Figure 1B:
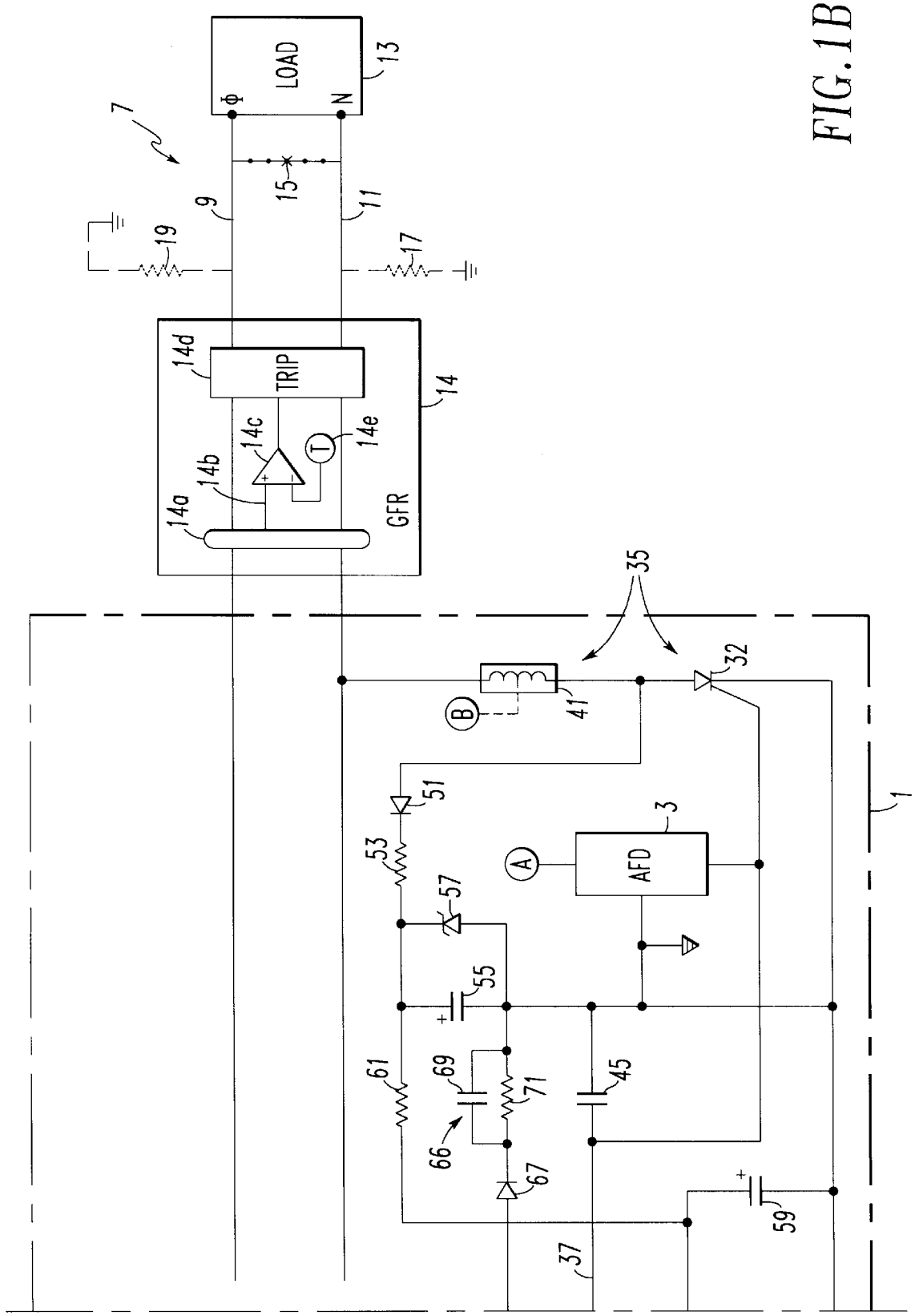

As shown in FIGS. 1A–1B, the circuit breaker 1 of the invention, such as a miniature equipment protector circuit breaker, in its preferred embodiment, combines an arc fault detector (AFD) 3, such as a sputtering arc detector, with a ground fault detector 5, although other embodiments of the invention need not employ AFD 3. An example of an AFD is disclosed in U.S. Pat. No. 5,519,561.

The circuit breaker 1 interrupts current in and thereby protects an alternating current (AC) electric system 7 which includes a power source 8, a line conductor 9, and a neutral conductor 11, which provide electric power to a load 13 through a downstream ground fault receptacle (GFR) 14. An example of a GFR is disclosed in U.S. Pat. No. 3,878,435 which is incorporated by reference herein.

In addition to protecting against a typical overcurrent drawn by the load 13 and bolted line-to-neutral faults, the circuit breaker 1 of the invention protects against sputtering arc faults, such as fault 15, between line conductor 9 and neutral conductor 11. The sputtering arc fault 15 results when bared sections of the line and neutral conductors 9,11 come in contact due to, for instance, worn or stripped insulation. The circuit breaker 1 also protects against line-to-ground faults occurring between CB 1 and GFR 14. The GFR 14 protects against neutral-to-ground faults, such as fault 17 between neutral conductor 11 and ground; and line-to-ground faults, such as fault 19 between line conductor 9 and ground.

Faults in the electric system 7 are detected by the circuit breaker 1 by current sensors in the form of current sensing transformer 20, such as a toroidal coil, and a bimetal 21. The line and neutral conductors 9,11 are passed through the opening in the toroidal coil 20 to form the primary of that current transformer. The secondary winding 22 of the current transformer 20 is connected to the ground fault detector 5.

The current transformer 20 detects line-to-ground faults. With no line-to-ground fault on the electric system 7, the currents through the line and neutral conductors 9,11, which form the primaries of the current transformer 20, are equal and opposite so that no current is induced in the secondary winding 22. If line conductor 9 is grounded, there will be a large current through that conductor and little or no current through neutral conductor 11 so that a sizable current will be induced in the secondary winding 22. A signal 23 at the secondary winding 22 is applied through a resistor 24 to a ground fault controller integrated circuit (IC) 25.

The circuit breaker 1 includes separable contacts 26 which can be tripped open by a spring operated trip mechanism 27. The trip mechanism 27 may be actuated by a conventional thermal-magnetic overcurrent device 28. This thermal-magnetic overcurrent device 28 includes the bimetal 21 connected in series with the line conductor 9. Persistent overcurrents heat up the bimetal 21 causing it to bend and release a latch 29 which actuates the trip mechanism 27. Short circuit currents through the bimetal 21 magnetically attract an armature 30 which alternatively releases the latch 29 to actuate the trip mechanism 27.

In addition to the thermal-magnetic overcurrent device 28, which provides conventional protection, the circuit breaker 1 includes AFD 3. The AFD 3 includes a lead 31 together with a circuit common connected to sense voltage across the bimetal 21. As the resistance of the bimetal 21 is known, this voltage is a measure of the current flowing through the line conductor 9. Such a current sensor is described in U.S. Pat. No. 5,519,561. Other types of current sensors (e.g., current transformers) for measuring the current through the line conductor 9 could be used. With the circuit common (i.e., GND of IC 25) connected to the ungrounded line conductor 9, interconnection to AFD 3 employing ohmic sensing of the line conductor 9 is facilitated.

The voltage across the bimetal 21 provides an arc fault sensor signal representative of an arc fault in the electric system 7 to AFD 3. The APD 3, in turn, responds to the arc fault sensor signal and generates an arc fault trip signal in the form of a current pulse to trigger SCR 32 through its gate upon detection of the arc fault in the electric system 7.

The exemplary circuit breaker 1 includes separable contacts 26 for interrupting current flow in the electric system 7; the current transformer 20 and the bimetal 21; the ground fault detector 5 connected to the current transformer 20; AFD 3 connected to the bimetal 21; and a trip circuit 35 responsive to a ground fault trip signal 37 at output SCR of IC 25, and further responsive to the arc fault trip signal output by AFD 3.

The exemplary GFR 14 also provides ground fault tripping for the load 13 of the electric system 7. The GFR 14 preferably employs a people protection trip curve compliant with UL 943 which deenergizes the load 13 for ground faults exceeding 6 mA and typically exceeding about 5 mA. Such a people protection trip curve is employed to protect people from electrical shock caused by ground faults. Although a ground fault receptacle is illustrated in the exemplary embodiment, other ground fault switches, such as cord-mounted or plug-mounted ground fault protection devices, may be employed. As understood by those skilled in the art, GPR 14 includes a current transformer 14a for generating an AC signal 14b from the protected AC electric system 7, and a comparator 14c for providing ground fault tripping (TRIP) 14d of GFR 14 when such AC signal 14b exceeds a threshold level (T) 14e (e.g., typically corresponding to a GFR threshold value of about 5 mA ground fault current in the conductors 9,11) in magnitude.

The current transformer 20 of FIG. 1A generates the AC sensor signal 23 representative of AC current flowing from the protected AC electric system 7 to ground (e.g., line-to-ground fault 19). The IC 25 forms a trip signal generating circuit connected to the current transformer 20 for generating the ground fault trip signal 37 at the output SCR as a function of the AC sensor signal 23 and a trip curve. Preferably, IC 25 employs an equipment protection trip curve, different than the exemplary people protection trip curve of GFR 14, which deenergizes the load 13 for ground faults exceeding 20 mA and typically exceeding about 18 mA. Such an equipment protection trip curve is employed to protect electrical equipment from ground faults. In this manner, the circuit breaker 1 provides coordinated ground fault tripping with GFR 14.

Continuing to refer to FIGS. 1A–1B, the trip circuit 35 responds to the ground fault trip signal 37 of IC 25 for opening the separable contacts 26. The trip circuit 35 includes SCR 32, a trip solenoid 41 driven by SCR 32, and the trip mechanism 27 driven by trip solenoid 41. Turning on of SCR 32 provides current for energization of trip solenoid 41 with current drawn from neutral conductor 11 to line conductor 9. The SCR 32 may be protected from surges by a metal oxide varistor (MOV) (not shown) and from noise on the gate by capacitor 45. Energization of trip solenoid 41 actuates the trip mechanism 27 as described in U.S. Pat. No. 4,081,852 to open separable contacts 26 at least in line conductor 9.

In the exemplary embodiment, the trip signal generating circuit IC 25 is a RV4141 low power ground fault interrupter marketed by Raytheon Semiconductor, although any suitable type of ground fault controller for providing a suitable trip curve may be employed. The IC 25 provides ground fault tripping which is delayed with respect to the ground fault tripping provided by GFR 14. The IC 25 includes an operational amplifier 39 having $V_{FB}$ and $V_{REF}$ inputs. A feedback resistor 40, connected to the output AMP OUT of the operational amplifier 39, sets the gain therefor. The operational amplifier 39 generates an amplified AC signal from the AC sensor signal 23. A comparator circuit 49 of the IC 25 generates the ground fault trip signal 37 when the amplified AC signal exceeds a threshold level in magnitude. In the exemplary embodiment, this threshold level preferably corresponds to a circuit breaker threshold value of about 18 mA ground fault current in the conductors 9,11.

Direct current (DC) power for IC 25 is provided to the input $+V_S$ through diode 51 the anode of which is connected between trip solenoid 41 and SCR 32. The current drawn by IC 25 is insufficient to actuate trip solenoid 41. The GND input of IC 25 is connected to line conductor 9.

On negative half-cycles of the AC voltage on line conductor 9, sufficient current flows from neutral conductor 11 through trip solenoid 41, diode 51 and resistor 53 to charge and generally maintain the charge on capacitor 55, with respect to the GND input of IC 25 and line conductor 9, without energizing trip solenoid 41. There is a need to maintain the charge on capacitor 55 for a short time after supplying gate current to the SCR 32. The SCR 32 can only conduct when the line conductor 9 is negative. There is a possibility that the decision to trip is made too late in the negative half cycle to accomplish a trip; therefore, the power supply must be able to supply gate current to the SCR 32 when the next negative half cycle occurs. Thus, the capacitor 55 must retain sufficient charge for about ¾ of a cycle (e.g., about 12 mS at 60 Hz). This requirement is not much different than during normal operation, where the rectifier will only conduct for about ¼ of a cycle. The discharge time is determined by the value of the capacitor 55 and the current drawn by the circuit. The SCR 32 is not able to discharge the capacitor 55, as the current cannot flow backward through diode 51. The input $+V_S$ of IC 25 is powered from bypass capacitor 59 which is charged by the charge of capacitor 55 through resistor 61. The pair of series resistors 53,61 provide power to the IC 25, with the voltage level of the input $+V_S$ determined by the four internal zener diodes of IC 25. The zener diode 57 protects the capacitor 55.

The operational amplifier 39 amplifies the AC sensor signal 23, generates an amplified AC signal therefrom, and applies the amplified AC signal to a window detector 63 of comparator circuit 49. The window comparator 63 compares the amplified AC signal to positive and negative reference levels. If the magnitude of either reference level is exceeded by the magnitude of the amplified AC signal, then the magnitude of the current in the secondary winding 22 of the current transformer 20 exceeds the threshold level selected to detect a line-to-ground fault, and the window comparator 63 generates a comparison signal which starts a delay circuit 65. If the AC sensor signal 23, which corresponds to the ground fault current flowing in the conductors 9,11, exceeds a predetermined trip threshold level set by resistor 40 for longer than the delay time set by the delay circuit 65 of IC 25 and an external delay circuit 66 for delay circuit 65, a comparator 64 of comparator circuit 49 generates a trip signal in the form of a current pulse at output SCR of IC 25 to trigger SCR 32 through its gate. As shown in the exemplary embodiment of FIGS. 1A–1B, which includes AFD 3, the output of AFD 3 is directly connected to the output SCR of IC 25. The comparator 64, the delay circuit 65 of IC 25, and the external delay circuit 66 form an output circuit responsive to the comparison signal of window comparator 63 for delayed generation of the ground fault trip signal 37 from the comparison signal.

The exemplary external delay circuit 66, which is connected to the output DELAY CAP of IC 25, is employed to define the trip curve of IC 25. The circuit 66 includes a diode 67, a capacitor 69 and a resistor 71. In the exemplary embodiment, the delay circuit 65 of IC 25 charges capacitor 69 to the delay trigger voltage through diode 67 over multiple half-cycles of the AC voltage on the conductors 9,11. The resistor 71 is selected to discharge capacitor 69 in a relatively longer time frame, while diode 67 prevents discharge of capacitor 69 through the internal delay circuit 65 of IC 25. Due to the relatively large value of current employed to discharge the time delay capacitor 69, the internal discharge current source of IC 25 is isolated from capacitor 69 by diode 67, and a relatively lower value of discharge current for capacitor 69 is provided by the parallel resistor 71.

Figure 2:
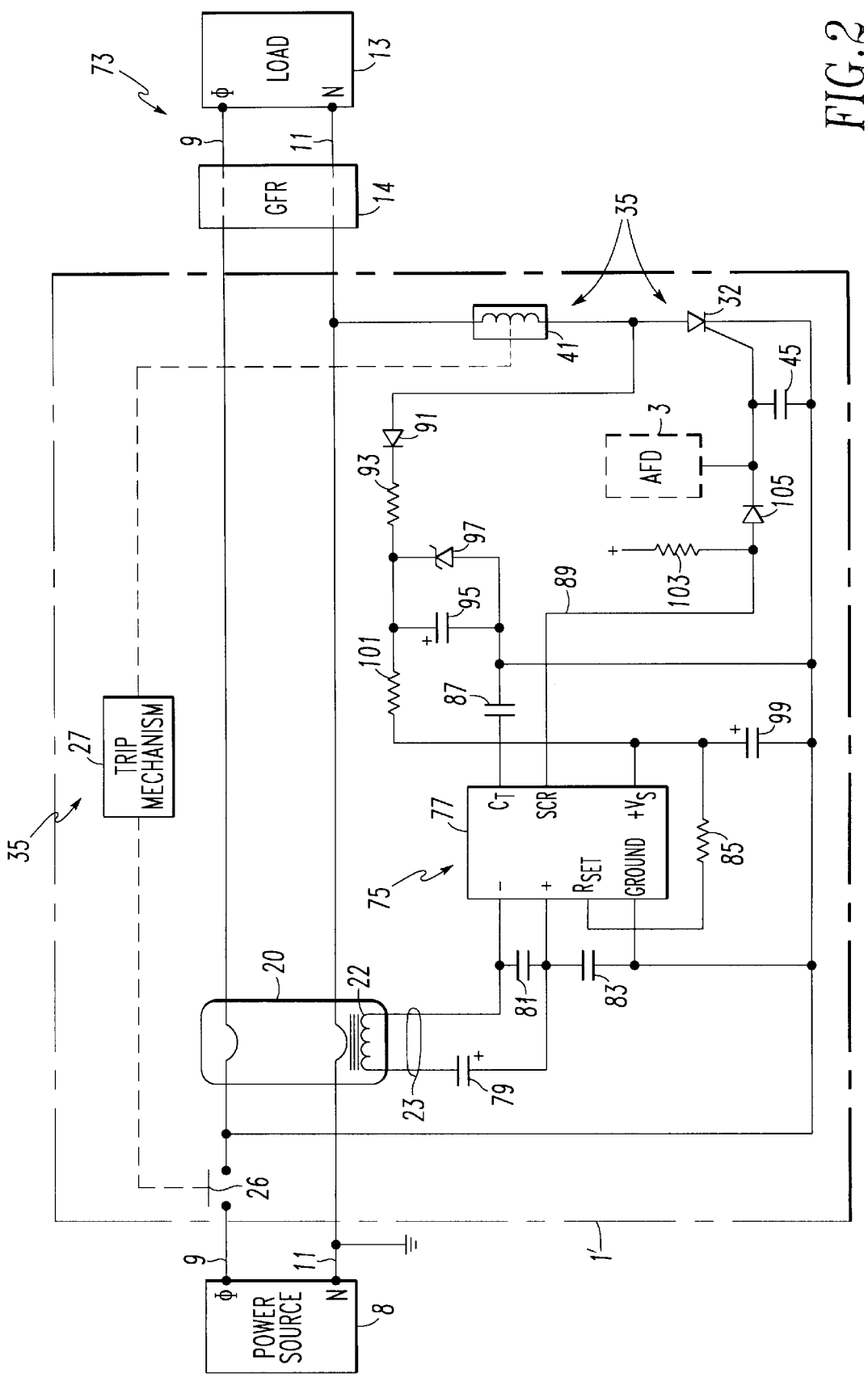
FIG. 2 is a schematic diagram of another embodiment of the ground fault circuit interrupter of the invention.

As shown in FIG. 2, an alternative circuit breaker 1' of the invention is illustrated which employs some common features as the circuit breaker 1 of FIGS. 1A–1B, including the arc fault detector (AFD) 3 (and the bimetal 21 which is not shown in FIG. 2 for clarity and simplicity of illustration), separable contacts 26, and trip circuit 35. The circuit breaker 1' interrupts current in and thereby protects an alternating current (AC) electric system 73. The AC electric system 73 includes the power source 8, line conductor 9, and neutral conductor 11, which provide electric power to the load 13 through the downstream ground fault receptacle (GFR) 14. The circuit breaker 1' employs current sensing transformer 20 and an alternative ground fault detector 75. The secondary winding 22 of the current transformer 20 is connected to the ground fault detector 75.

The signal 23 at the secondary winding 22 is applied to a ground fault controller integrated circuit (IC) 77 including an operational amplifier (not shown) having "+" and "−"

inputs with a capacitor 79 connected between the secondary winding 22 and the "+" input. Exemplary IC 77 is an LM1851 ground fault interrupter marketed by Raytheon Semiconductor, although any other suitable type of ground fault controller for providing a suitable trip curve may be employed. A capacitor 81 between the inputs of the operational amplifier and a capacitor 83 between the "+" input and the input GROUND improve noise immunity of IC 77. A resistor 85, connected between the terminal $R_{SET}$ and the power supply input $+V_S$ sets a value of current, a multiple of which is employed by IC 77 to discharge a capacitor 87, connected between the output $C_T$ and the input GROUND.

The IC 77 forms a trip signal generating circuit connected to the current transformer 20 for generating a ground fault trip signal 89 at output SCR as a function of the AC sensor signal 23 and another trip curve. Preferably, IC 77 employs an equipment protection trip curve, different than the people protection trip curve of GFR 14, which deenergizes the load 13 for ground faults exceeding 20 mA and typically exceeding about 18 mA. In this manner, the circuit breaker 1' provides coordinated ground fault tripping with GFR 14.

The trip circuit 35 responds to the ground fault trip signal 89 of IC 77 for opening the separable contacts 26. DC power for IC 77 is provided to the input $+V_S$ through diode 91 the anode of which is connected between trip solenoid 41 and SCR 32. The current drawn by IC 77 is insufficient to actuate trip solenoid 41. The input GROUND of IC 77 is connected to line conductor 9.

On negative half-cycles of the AC voltage on line conductor 9, sufficient current flows from neutral conductor 11 through trip solenoid 41, diode 91 and resistor 93 to charge and generally maintain the charge on capacitor 95, with respect to the input GROUND of IC 77 and line conductor 9, without energizing trip solenoid 41. The input $+V_S$ of IC 77 is powered from bypass capacitor 99 which is charged by the charge of capacitor 95 through resistor 101. The pair of series resistors 93,101 provide power to the IC 77, with the voltage level of the input $+V_S$ determined by an internal zener diode (not shown) of IC 77. The zener diode 97 protects the capacitor 95.

When the AC sensor signal 23 is present and corresponds to a ground fault current in the conductors 9,11, the timing capacitor 87 for IC 77 is charged until its voltage exceeds a threshold voltage of a latch (not shown) of IC 77. When the threshold voltage is exceeded, the latch is set and the output SCR of IC 77 is driven to a high impedance state. In turn, a pull-up resistor 103 generates a trip signal through diode 105 to trigger SCR 32 through its gate. As shown in the exemplary embodiment of FIG. 2, which includes AFD 3, the output of AFD 3 is directly connected to the cathode of diode 105 which isolates the output transistor (not shown) of the latch of IC 77 from AFD 3. In this manner, the output of AFD 3 is "OR'd" with the output SCR of IC 77, as that output SCR is held at ground potential in an untripped condition.

The resistor 85 and capacitor 87 define the trip curve of IC 77. The resistor 85 determines the current threshold level while the capacitor 87 determines the value of the delay. Suitable adjustments (i.e., increases or decreases) to the value of the delay in the trip curve are provided by adjusting (i.e., increasing or decreasing, respectively) the value of the time delay capacitor 87.

Both of the circuit breakers 1 and 1' of FIGS. 1A–1B and 2 employ ICs 25 and 77, respectively, which are designed for delayed ground fault sensing, although other circuit configurations are possible, including the use of a custom integrated circuit, which may or may not include AFD, such as AFD 3. The delays conventionally employed with the exemplary RV4141 and LM1851 controllers are relatively short and are employed to provide enhanced noise immunity. In contrast, in the exemplary embodiments, in order to provide trip coordination with the exemplary GFR 14, the exemplary delay times are greater than those delay times employed to provide enhanced noise immunity. Circuit values are selected to provide an exemplary threshold or pick-up value at about 18 mA of ground fault current. This typical value, for example, ensures operation at 20 mA with component tolerances totaling 10%. Although other threshold values may be employed, when employed with a downstream GFR, the minimum threshold value is above the 6 mA maximum threshold value of the GFR.

Figure 3:
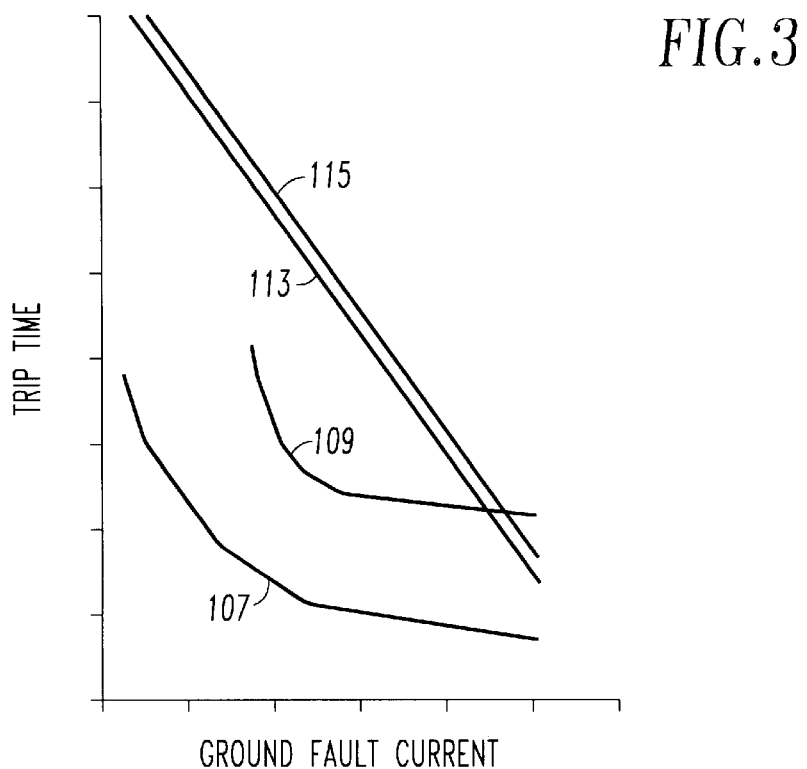
FIG. 3 is a plot of the trip curves of a ground fault receptacle (GFR) and the ground fault circuit interrupter of FIGS. 1A–1B.
Figure 4:
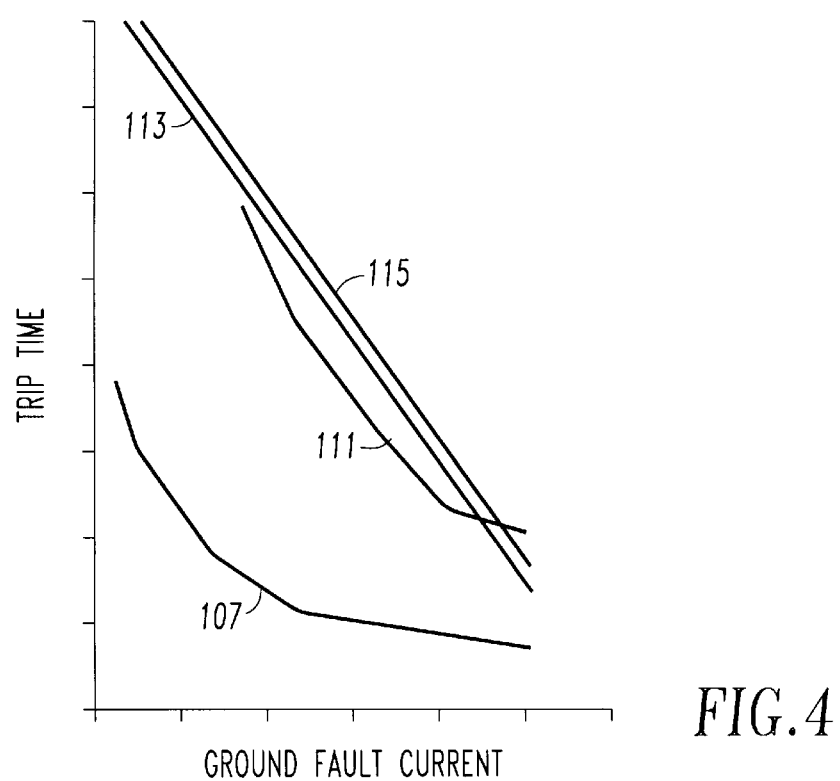
FIG. 4 is a plot of the trip curves of a ground fault receptacle (GFR) and the ground fault circuit interrupter of FIG. 2.

FIG. 3 illustrates a plot 107 of the trip curve of GFR 14 and a plot 109 of the trip curve of the circuit breaker 1 of FIGS. 1A–1B. FIG. 4 illustrates the GFR plot 107 and a plot 111 of the trip curve of the circuit breaker 1' of FIG. 2. The plots 107,109,111 are measured trip time versus measured ground fault current. For the GFR 14, the maximum trip times are plotted. For the circuit breakers 1,1', the minimum trip times are plotted. Sufficient separation between the pairs of plots 107,109 and 107,111 ensures trip coordination, even if component tolerances move either or both of plots 107, 109 or 107,111 toward each other. The shapes of the plots produced by the exemplary circuit breakers 1,1' differ appreciably, with the trip curve produced by the circuit breaker 1 more closely paralleling the trip curve produced by GFR 14, and, therefore, being preferred for the purpose of producing faster tripping while maintaining trip coordination.

In the circuit breaker 1 of FIGS. 1A–1B, the comparator 39 provides an output when AC sensor signal 23 is above a threshold. For a sinusoidal input, the comparator output pulse width is a function of the input current amplitude. The comparator output controls the charging current for the external capacitor 69 and, therefore, as the pulse width increases, the average current charging the capacitor 69 will increase. Additionally, the capacitor discharge current subtracts current from the capacitor 69. Thus, the trip curve 109 is produced as shown in FIG. 3, where initially the curve is very steep, due to the combined effects of the comparator output width changing rapidly for small changes in the input amplitude, and the effect of subtracting the discharge current from the average comparator output. At larger input amplitudes, the pulse width does not change as rapidly, and the average current is much larger than the discharge current, thus, the trip curve 109 flattens considerably.

The exemplary trip curve 107 of FIG. 3 is a people protection trip curve consistent with UL 943 in which a ground fault current of less than 6 mA (e.g., about 5 mA) is provided. The exemplary trip curve 109 is an equipment protection trip curve in which a ground fault current of less than 20 mA (e.g., about 18 mA) is provided. The exemplary GFR 14 includes a delay, in order to improve noise immunity and thereby reduce false tripping, although many GFRs do not include an intentional delay, and will trip even faster.

Also shown for reference in FIGS. 3 and 4 are two lines representing the UL limits for ground fault trip times. The lower line 113, shows the limit for the average of ten trips, while the upper line 115, shows the allowable limit for any trip.

The exemplary circuit breakers 1,1' employ ground fault trip curves coordinated with the trip curve of the exemplary GFR 14. For all ground faults which occur beyond the GFR 14, such GFR interrupts the circuit before the circuit breakers 1,1' respond, thereby maintaining the ability to reset locally. These circuit breakers also provide protection for ground faults due to damaged permanent wiring, which might otherwise be a precursor to a fire, and also due to damaged plug-in wiring when a GFR is not used. As the exemplary circuit breakers 1,1' respond more slowly than the GFR 14, and also have a larger threshold value than such GFR, they do not meet the performance requirements of a personnel protecting ground fault circuit interrupter, but they do meet the requirements of an equipment protector (EP).

Figure 5:
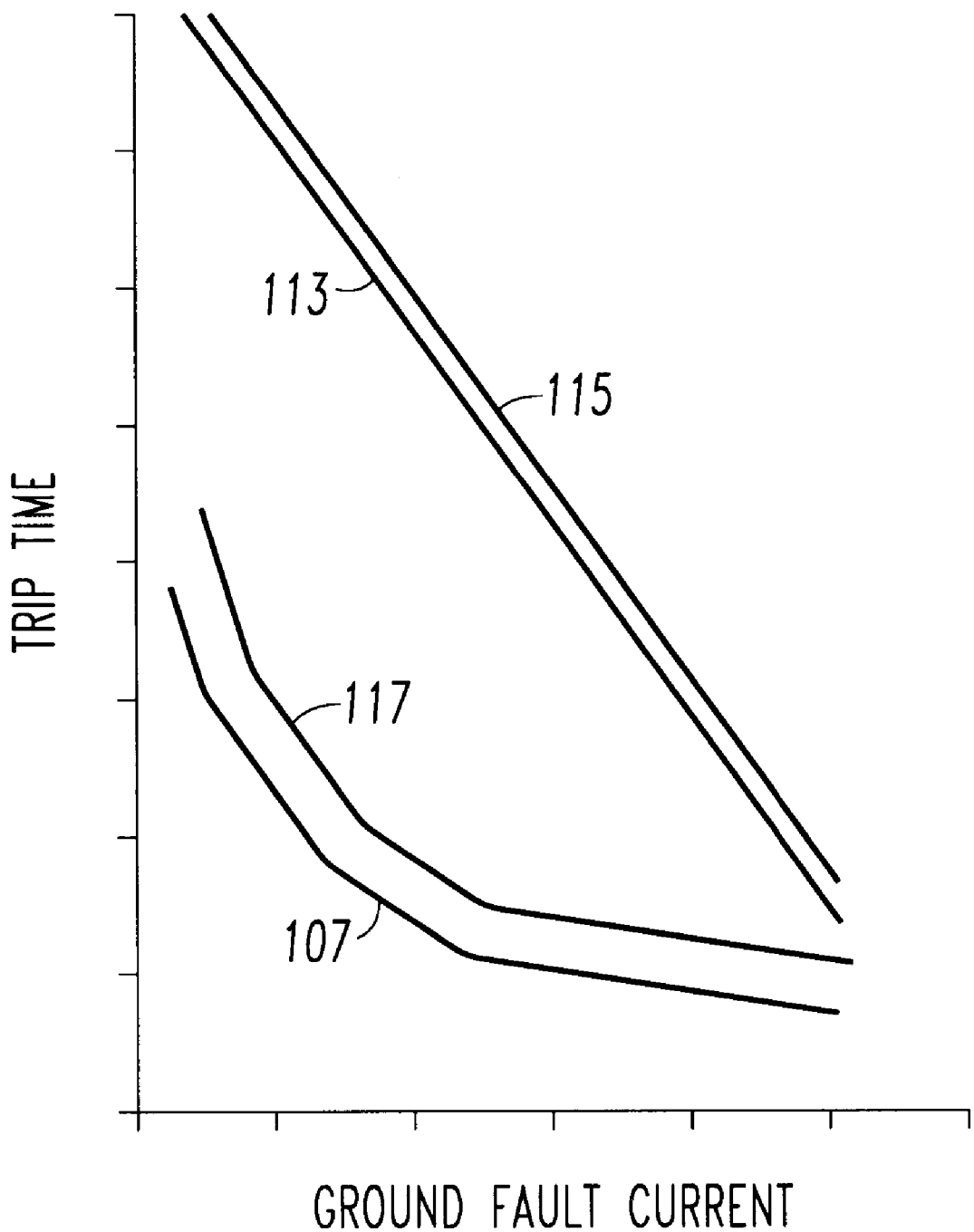
FIG. 5 is a plot of the trip curves of a ground fault receptacle (GFR) and another embodiment of the ground fault electrical switching apparatus of the invention.

Referring to FIG. 5, the plot 107 of the trip curve of GFR 14 and a plot 117 of the trip curve of a delayed EP circuit, such as that of an alternative ground fault circuit breaker, are illustrated. In this embodiment, the delayed EP trip curve is made as close as possible, allowing for production tolerances, to the GFR trip curve. This EP trip curve represents the maximum sensitivity usable for an EP circuit coordinated with a GFR. The threshold value of the EP trip curve is greater than the threshold value of the GFR trip curve by the value of a constant, which is preselected to overcome the production tolerances of the trip curves of the GFR 14 and the delayed EP circuit, and the time to trip of the EP trip curve is longer than the time to trip of the GFR trip curve.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A ground fault electrical switching apparatus for interrupting current in a protected alternating current (AC) electric system, said electric system including a downstream ground fault switch, a power source, and a load, said downstream ground fault switch having a first ground fault trip curve, said ground fault electrical switching apparatus comprising:

separable contact means of said ground fault electrical switching apparatus for interrupting current flow in said protected AC electric system when opened, said separable contact means connected in series with said downstream ground fault switch between said power source and said load;

sensing means for generating at least an AC sensor signal representative of AC current flowing from said protected AC electric system to ground;

ground fault trip signal generating means connected to said sensing means for generating at least a ground fault trip signal as a function of said AC sensor signal and a second ground fault trip curve which is different from the first ground fault trip curve of said downstream ground fault switch; and trip means responsive to said ground fault trip signal for opening said separable contact means.

2. The ground fault electrical switching apparatus of claim 1 wherein said ground fault trip signal generating means includes means for coordinating said second ground fault trip curve with said first ground fault trip curve of said ground fault switch.

3. The ground fault electrical switching apparatus of claim 1 wherein said ground fault switch provides ground fault tripping; and wherein said ground fault trip signal generating means comprises means for providing ground fault tripping which is delayed with respect to the ground fault tripping provided by said ground fault switch in order that for a ground fault downstream of said ground fault switch said ground fault switch interrupts current in said protected AC electric system before said ground fault trip signal generating means generates said ground fault trip signal to, otherwise, open said separable contact means and interrupt current flow in said protected AC electric system.

4. The ground fault electrical switching apparatus of claim 1 wherein said ground fault switch comprises means for generating an AC signal from the protected AC electric system, and first comparator means for providing ground fault tripping of said ground fault switch when the AC signal of said ground fault switch exceeds a first threshold level in magnitude; wherein said ground fault trip signal generating means comprises amplifier means for generating an amplified AC signal from the AC sensor signal, and comparator means for generating the ground fault trip signal when said amplified AC signal exceeds a second threshold level in magnitude; and wherein the second threshold level is greater than the first threshold level.

5. The ground fault electrical switching apparatus of claim 1 wherein said ground fault electrical switching apparatus is a ground fault circuit breaker.

6. The ground fault electrical switching apparatus of claim 1 wherein the first trip curve of said ground fault switch employs a people protection ground fault trip curve; and wherein the second ground fault trip curve of said ground fault trip signal generating means employs an equipment protection trip curve.

7. The ground fault electrical switching apparatus of claim 1 wherein said ground fault switch comprises means for generating an AC signal from the protected AC electric system, and first comparator means for providing ground fault tripping of said ground fault switch when the AC signal of said ground fault switch exceeds a first threshold level in magnitude; and wherein said ground fault trip signal generating means comprises amplifier means for generating an amplified AC signal from the AC sensor signal, comparator means for comparing the amplified AC signal with at least one second threshold level and generating a comparison signal as a function of the amplified AC signal and the at least one second threshold level, and output means responsive to the comparison signal for delayed generation of the ground fault trip signal from the comparison signal.

8. The ground fault electrical switching apparatus of claim 7 wherein said output means includes means for providing ground fault tripping which is delayed with respect to the ground fault tripping provided by said ground fault switch; wherein said first ground fault trip curve of said ground fault switch has a first threshold value of ground fault current, which corresponds to the first threshold level, and a first production tolerance; wherein said second ground fault trip curve has a second threshold value of ground fault current, which corresponds to the second threshold level, and a second production tolerance; and wherein the second threshold value is greater than the first threshold value by the value of a constant, which is preselected to overcome said first and second production tolerances.

9. The ground fault electrical switching apparatus of claim 1 wherein said sensing means includes means for generating an arc fault sensor signal representative of an arc fault in said protected AC electric system; wherein said ground fault trip signal generating means includes arc fault detection means responsive to the arc fault sensor signal for generating an arc fault trip signal upon detection of said arc fault in said protected AC electric system; and wherein said trip means is further responsive to said arc fault trip signal to open said separable contact means.

10. The ground fault electrical switching apparatus of claim 9 wherein said ground fault trip signal generating means includes means for coordinating said second ground fault trip curve with said first ground fault trip curve of said ground fault switch.

11. The ground fault electrical switching apparatus of claim 10 wherein said ground fault switch provides ground fault tripping; and wherein said ground fault trip signal generating means includes means for providing ground fault tripping which is delayed with respect to the ground fault tripping provided by said ground fault switch in order that for a ground fault downstream of said ground fault switch said ground fault switch interrupts current in said protected AC electric system before said ground fault trip signal generating means generates said ground fault trip signal to, otherwise, open said separable contact means and interrupt current flow in said protected AC electric system.

12. The ground fault electrical switching apparatus of claim 11 wherein said ground fault switch comprises means for generating an AC signal from the protected AC electric system, and first comparator means for providing the ground fault tripping of said ground fault switch when the AC signal of said ground fault switch exceeds a first threshold level in magnitude; wherein said ground fault trip signal generating means further includes amplifier means for generating an amplified AC signal from the AC sensor signal, and comparator means for generating the ground fault trip signal when said amplified AC signal exceeds a second threshold level in magnitude; and wherein the second threshold level is greater than the first threshold level.

13. The ground fault electrical switching apparatus of claim 12 wherein said amplifier means comprises an operational amplifier.

14. The ground fault electrical switching apparatus of claim 9 wherein said ground fault electrical switching apparatus is a miniature circuit breaker.

15. The ground fault electrical switching apparatus of claim 9 wherein said ground fault switch comprises means for generating an AC signal from the protected AC electric system, and first comparator means for providing ground fault tripping of said ground fault switch when the AC signal of said ground fault switch exceeds a first threshold level in magnitude; and wherein said ground fault trip signal generating means includes amplifier means for generating an amplified AC signal from the AC sensor signal, comparator means for comparing the amplified AC signal with at least one second threshold level and generating a comparison signal as a function of the amplified AC signal and the at least one second threshold level, and output means responsive to the comparison signal for delayed generation of the ground fault trip signal from the comparison signal.

16. The ground fault electrical switching apparatus of claim 15 wherein said ground fault trip signal generating means further includes means for providing ground fault tripping which is delayed with respect to the ground fault tripping provided by said ground fault switch; wherein said first ground fault trip curve of said ground fault switch has a first threshold value of ground fault current, which corresponds to the first threshold level, and a first production tolerance; wherein said second ground fault trip curve has a second threshold value of ground fault current, which corresponds to the second threshold level, and a second production tolerance; and wherein the second threshold value is greater than the first threshold value by the value of a constant, which is preselected to overcome said first and second production tolerances.

17. A protected alternating current (AC) electric system for use between a power source and a load, said system comprising:
   a ground fault switch having a first ground fault trip curve; and
   a ground fault electrical switching apparatus comprising:
      separable contact means of said ground fault electrical switching apparatus for interrupting current flow in said protected AC electric system when opened, said separable contact means connected in series with said ground fault switch between said power source and said load,
      sensing means for generating at least an AC sensor signal representative of AC current flowing from said protected AC electric system to ground,
      ground fault trip signal generating means connected to said sensing means for generating at least a ground fault trip signal as a function of said AC sensor signal and a second ground fault trip curve which is different from the first ground fault trip curve of said ground fault switch, and
      trip means responsive to said ground fault trip signal for opening said separable contact means.

18. The protected AC electric system of claim 17 wherein said ground fault switch is a cord-mounted or plug-mounted ground fault protection device.

19. The protected AC electric system of claim 17 wherein said ground fault switch is a ground fault receptacle.

20. The protected AC electric system of claim 17 wherein said protected AC electric system is adapted for use with a load; and wherein said ground fault switch is between said ground fault electrical switching apparatus and said load.

* * * * *